United States Patent
Garrido

(10) Patent No.: US 12,239,118 B2
(45) Date of Patent: Mar. 4, 2025

(54) FISHING POLE SUPPORT ASSEMBLY

(71) Applicant: Antonio Garrido, San Juan Capistrano, CA (US)

(72) Inventor: Antonio Garrido, San Juan Capistrano, CA (US)

( * ) Notice: Subject to any disclaimer, the term of this patent is extended or adjusted under 35 U.S.C. 154(b) by 204 days.

(21) Appl. No.: 18/095,672

(22) Filed: Jan. 11, 2023

(65) Prior Publication Data

US 2024/0224970 A1    Jul. 11, 2024

(51) Int. Cl.
*A01K 97/10* (2006.01)

(52) U.S. Cl.
CPC .................... *A01K 97/10* (2013.01)

(58) Field of Classification Search
CPC ............. A01K 97/10; A45F 2200/0566; A45F 2005/1073; Y10S 224/907; Y10S 224/922; Y10S 224/242
USPC ......... 43/21.2; 224/191, 195, 251, 907, 922, 224/242
See application file for complete search history.

(56) References Cited

U.S. PATENT DOCUMENTS

| | | | | | |
|---|---|---|---|---|---|
| 1,042,511 | A | * | 10/1912 | Watrous | E05C 19/14 292/247 |
| 1,321,842 | A | * | 11/1919 | Otto | G11B 5/332 248/302 |
| 1,676,032 | A | * | 7/1928 | Howard | E04H 12/32 248/539 |
| 1,967,427 | A | * | 7/1934 | Puckett | A01K 97/10 248/302 |
| 2,143,109 | A | * | 1/1939 | Hadaway | A01K 97/10 248/516 |
| 2,212,212 | A | * | 8/1940 | Planitz | A01K 97/10 24/339 |
| 2,487,094 | A | * | 11/1949 | Brown | A01K 97/10 248/629 |
| 2,512,151 | A | * | 6/1950 | Harrison | A01K 97/10 248/533 |
| 2,519,612 | A | * | 8/1950 | Tuttle | A01K 97/10 126/30 |
| 2,658,650 | A | * | 11/1953 | Jasper | A01K 97/10 224/907 |
| 2,775,838 | A | * | 1/1957 | Miller | A01K 97/01 43/21.2 |

(Continued)

FOREIGN PATENT DOCUMENTS

WO    WO2004036980    5/2004

*Primary Examiner* — Peter M Poon
*Assistant Examiner* — Marisa V Conlon
(74) *Attorney, Agent, or Firm* — Wansent

(57) ABSTRACT

A fishing pole support assembly includes a member that is formed into an ovoid shape having each of a pair of ends of the member being spaced apart from each other. The member has a pair of coils each formed into the member and the coils are positioned on opposing sides of the ovoid shape defined by the member. In this way a cup pin of a fishing belt can be extended through each of the pair of coils for attaching the member to a cup of the fishing belt. The member extends beneath a handle of a fishing rod when the handle of the fishing rod is inserted into the cup of the fishing belt thereby facilitating the member to bias the fishing rod to angle upwardly with respect to the cup. In this way the member can assist a fisherman with landing a pelagic fish with the fishing rod.

8 Claims, 9 Drawing Sheets

(56) References Cited

U.S. PATENT DOCUMENTS

| | | | |
|---|---|---|---|
| 2,803,387 A * | 8/1957 | Pearce | A01K 97/10 224/269 |
| 2,846,129 A * | 8/1958 | O'Brien | A01K 97/10 224/907 |
| 2,900,153 A * | 8/1959 | Lazur | A01K 97/10 248/408 |
| 3,015,467 A * | 1/1962 | Vieaux | A01K 97/10 43/21.2 |
| 3,184,192 A | 5/1965 | Hoerr | |
| 3,523,666 A * | 8/1970 | Bloodsworth | A01K 97/10 248/156 |
| 3,750,918 A | 8/1973 | Jensen | |
| 3,835,568 A * | 9/1974 | Whitfield | A01K 97/10 43/17 |
| 3,885,721 A * | 5/1975 | Vanus | A45F 5/02 224/676 |
| 3,956,846 A * | 5/1976 | Kent | A01K 97/10 248/538 |
| 4,014,126 A * | 3/1977 | Samuels | A01K 91/02 43/25 |
| 4,517,761 A * | 5/1985 | Bleggi | A01K 97/10 43/21.2 |
| D318,954 S | 8/1991 | Parkhurst | |
| 5,076,001 A | 12/1991 | Coon | |
| 5,813,162 A | 9/1998 | Tse | |
| 5,937,567 A * | 8/1999 | Elkins | A01K 97/10 248/538 |
| 6,022,055 A * | 2/2000 | Coulonvaux | F16B 2/185 24/270 |
| 6,050,019 A | 4/2000 | Anderson | |
| 6,264,080 B1 * | 7/2001 | Ewing | A45F 5/02 24/11 R |
| 8,413,714 B2 * | 4/2013 | Nie | G06F 1/20 24/270 |
| 9,931,887 B2 * | 4/2018 | Eberly, Jr. | B44D 3/14 |
| 11,178,862 B1 | 11/2021 | Forrester | |

* cited by examiner

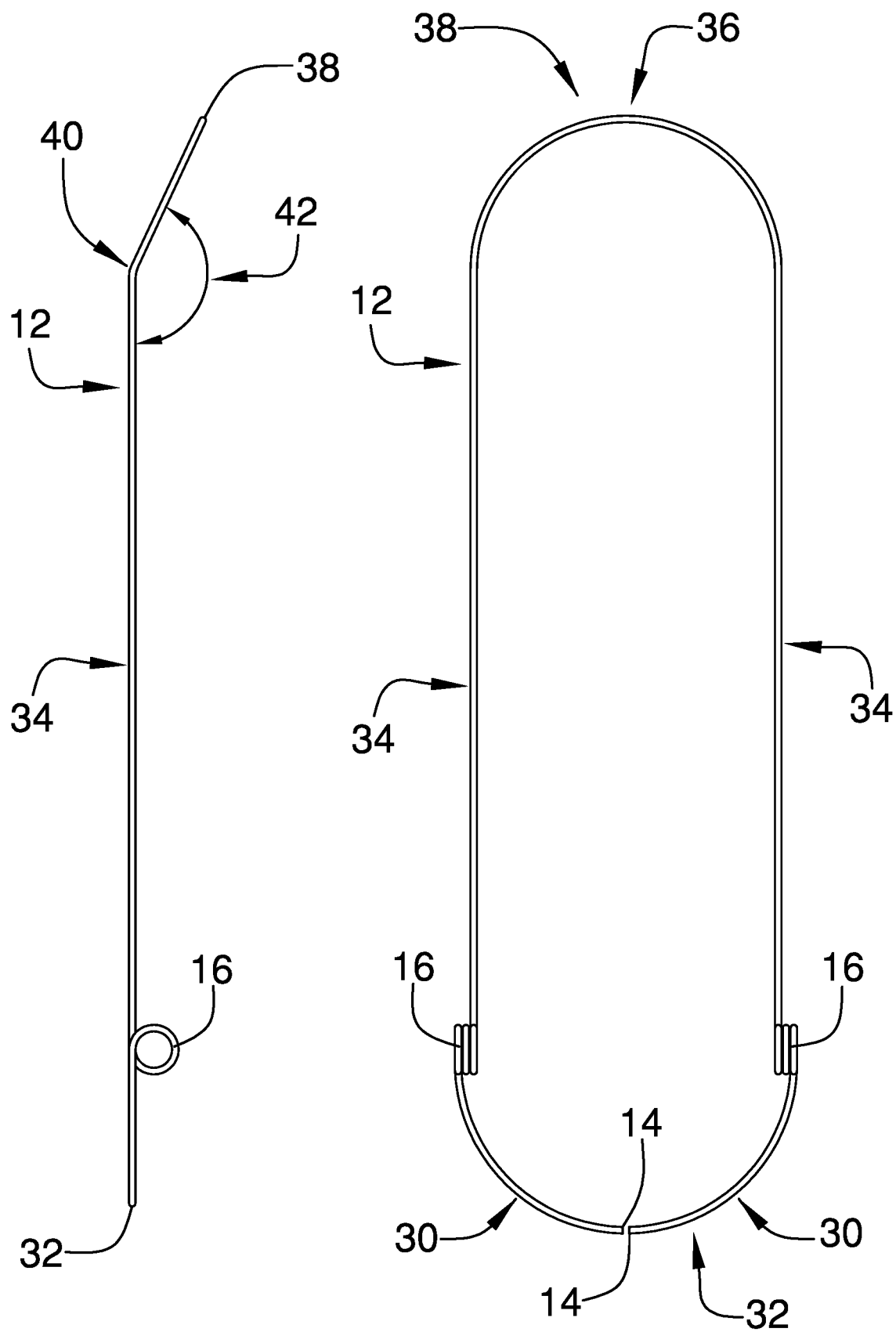

FISHING POLE SUPPORT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fishing pole devices and more particularly pertains to a new fishing pole device for assisting a fisherman with landing a pelagic fish. The device includes a member that is formed into an ovoid shape and which has a pair of coils integrated into the member. Each of the coils insertably receives a cup pin of a fishing belt for attaching the member to a cup of the fishing belt. The member engages a handle of a fishing rod when the handle is inserted into the cup. The coils facilitate the member to bias the fishing rod upwardly to assist the fisherman with landing the pelagic fish.

(2) Description of Related Art Including Information Disclosed Under 37 CFR 1.97 and 1.98

The prior art relates to fishing pole devices including a fishing rod holder that includes a clamp and a curved member. The prior art discloses a fishing rod holder that includes a spring biased latch for retaining a fishing rod at a variety of angled positions. The prior art discloses a fishing rod holder that includes a sleeve for insertably receiving a handle of a fishing rod and a spring attached between the sleeve and a mount. The prior art discloses a fishing rod holder that includes a rod that is vertically oriented, a holder pivotally attached to the rod for holding a fishing rod and biasing member attached between the rod and the holder.

BRIEF SUMMARY OF THE INVENTION

An embodiment of the disclosure meets the needs presented above by generally comprising a member that is formed into an ovoid shape having each of a pair of ends of the member being spaced apart from each other. The member has a pair of coils each formed into the member and the coils are positioned on opposing sides of the ovoid shape defined by the member. In this way a cup pin of a fishing belt can be extended through each of the pair of coils for attaching the member to a cup of the fishing belt. The member extends beneath a handle of a fishing rod when the handle of the fishing rod is inserted into the cup of the fishing belt thereby facilitating the member to bias the fishing rod to angle upwardly with respect to the cup. In this way the member can assist a fisherman with landing a pelagic fish with the fishing rod.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a right side view of an embodiment of the disclosure.

FIG. 3 is a top view of an embodiment of the disclosure.

DETAILED DESCRIPTION OF THE INVENTION

Figure 1:
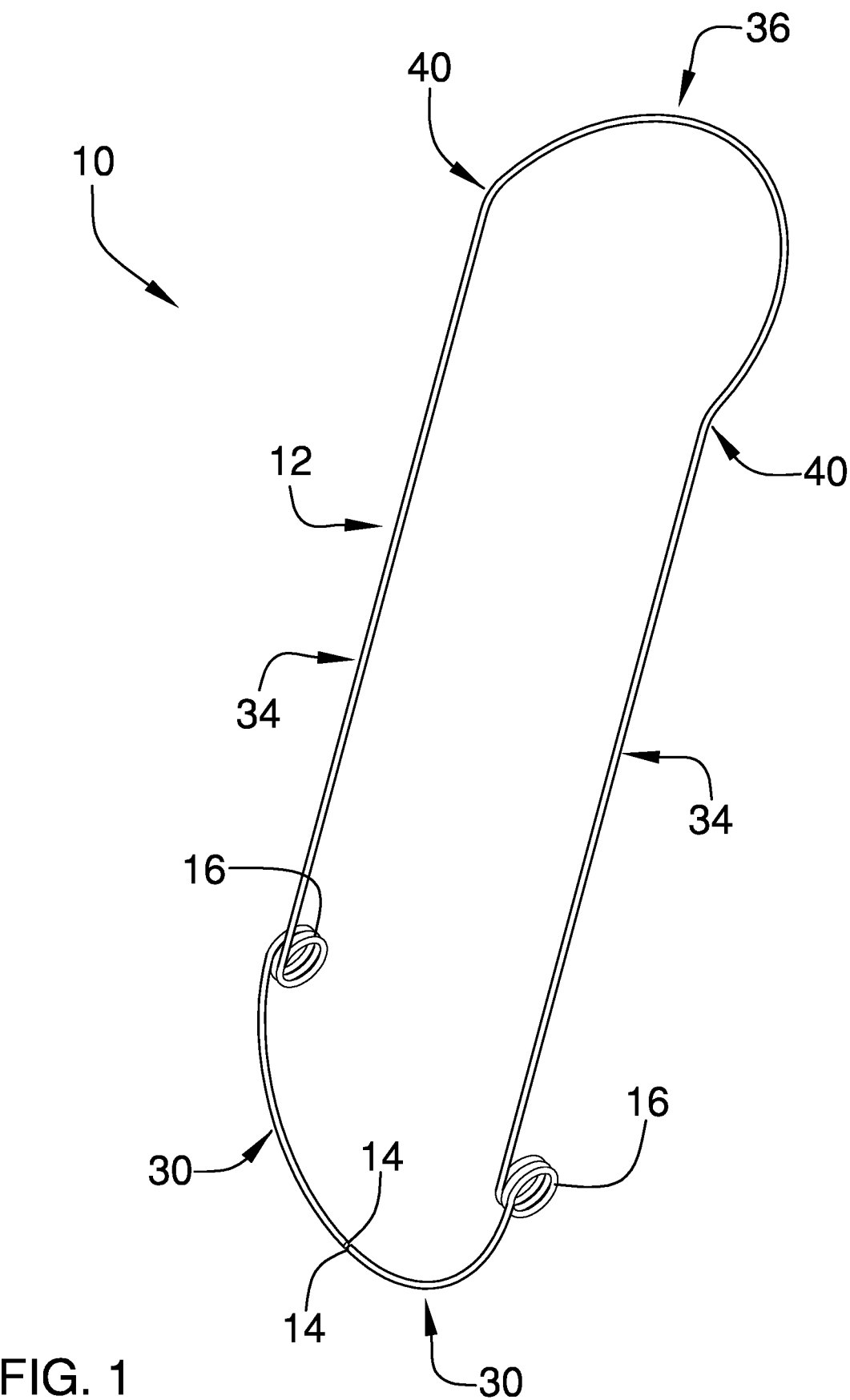
FIG. 1 is a perspective view of a fishing pole support assembly according to an embodiment of the disclosure.
Figure 4:
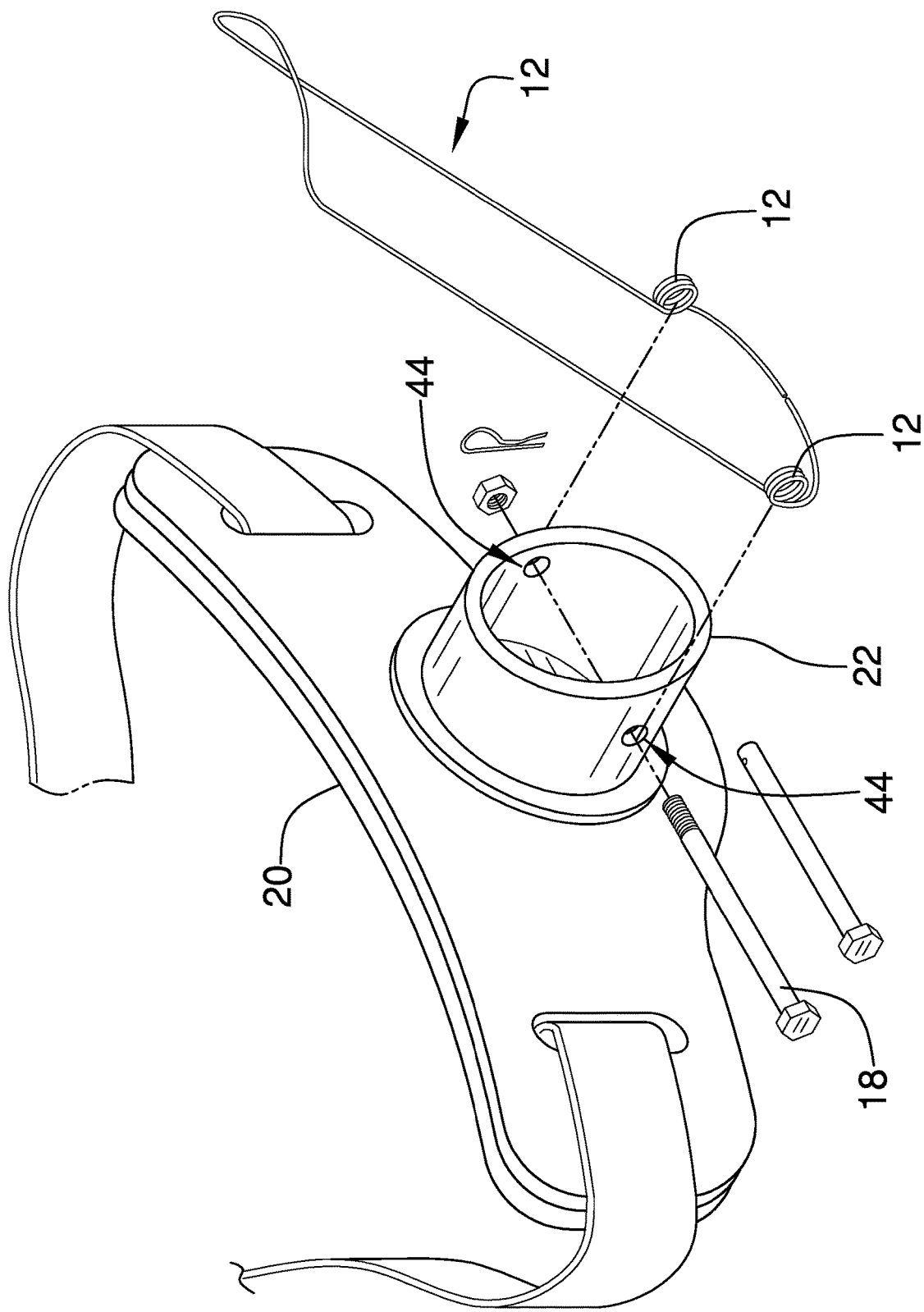
FIG. 4 is an exploded perspective view of an embodiment of the disclosure.
Figure 5:
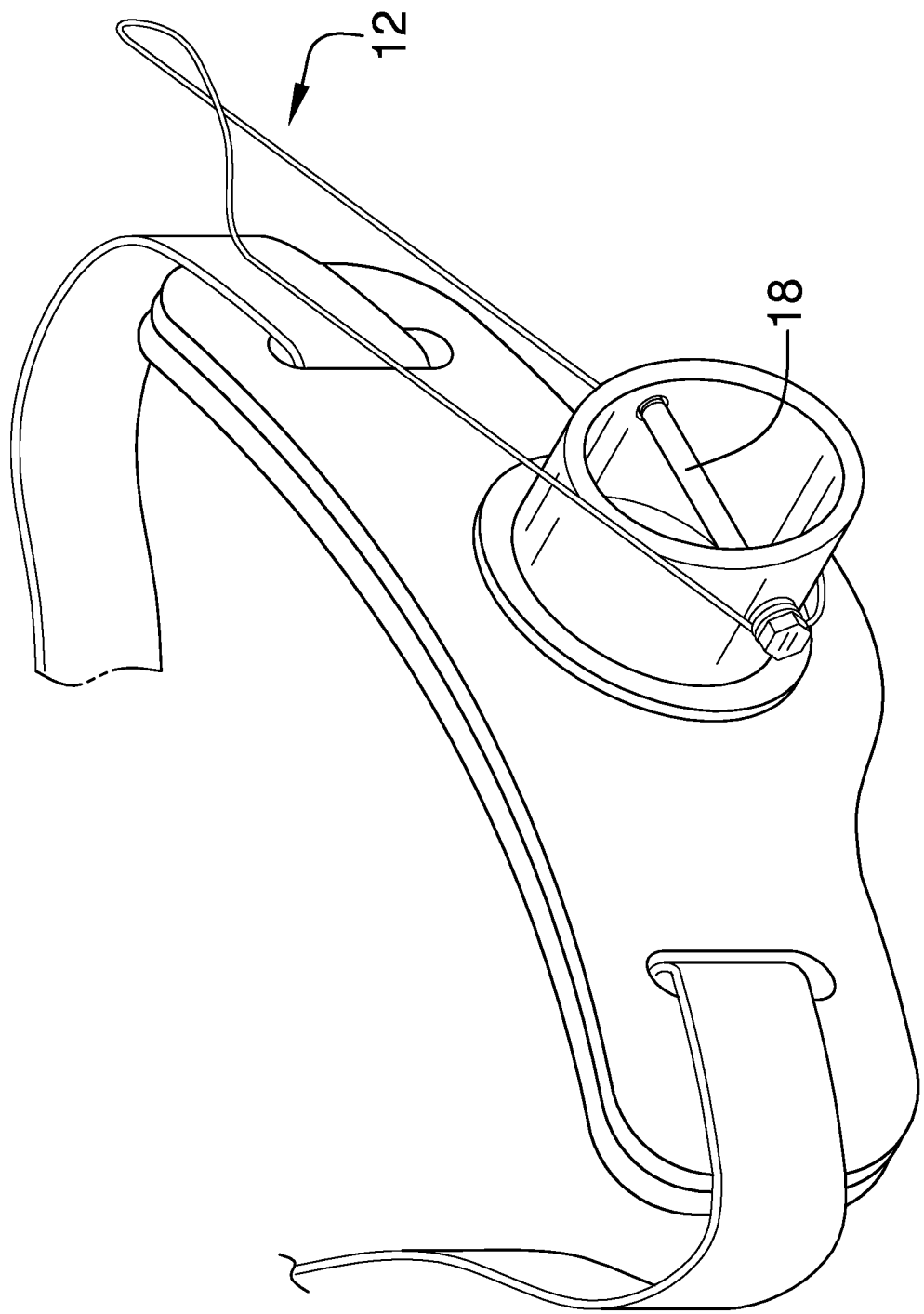
FIG. 5 is a perspective view of an embodiment of the disclosure showing a member being attached to a fishing belt.
Figure 6:
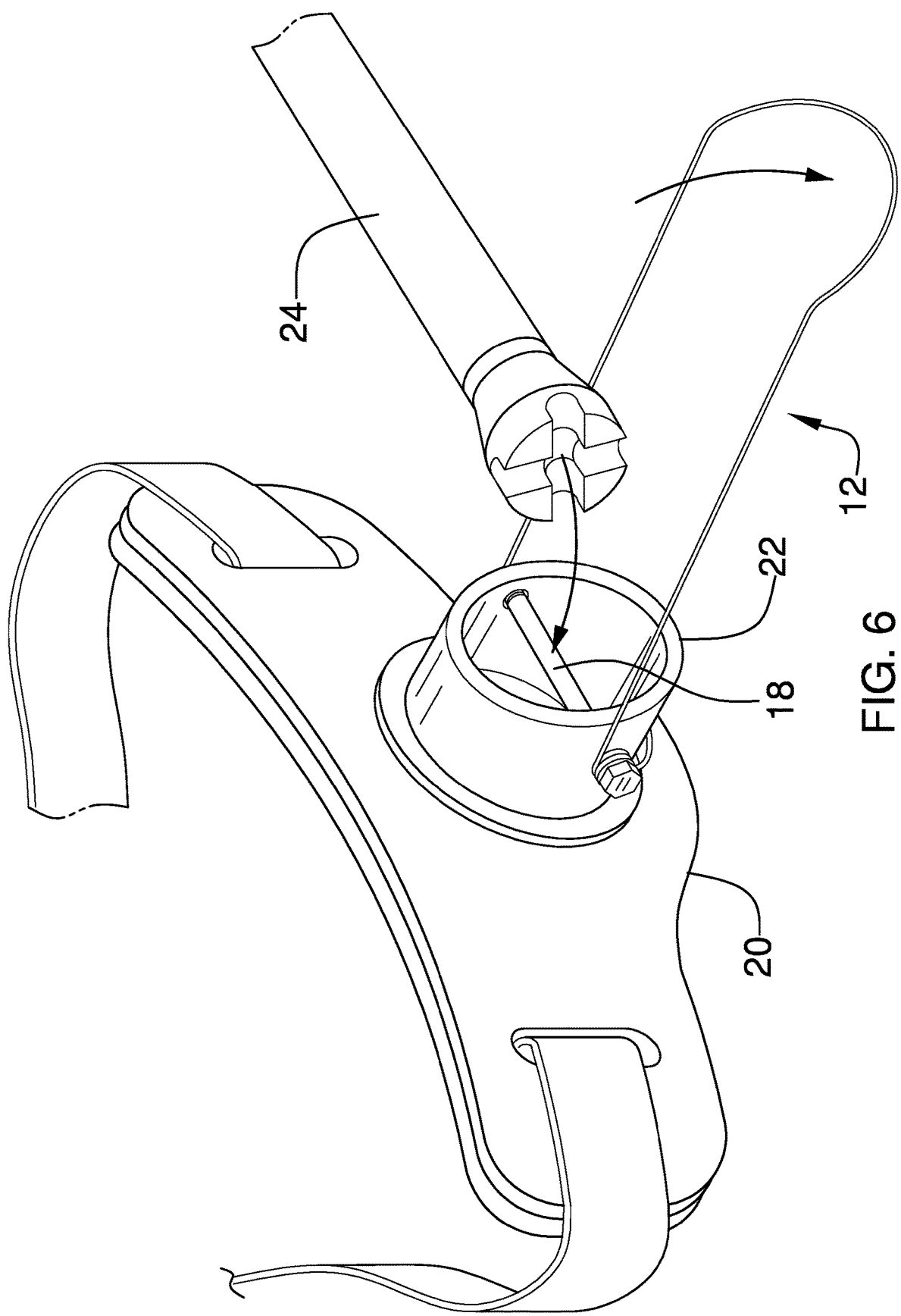
FIG. 6 is a perspective view of an embodiment of the disclosure showing a handle of fishing rod being inserted into a cup of a fishing belt.
Figure 7:
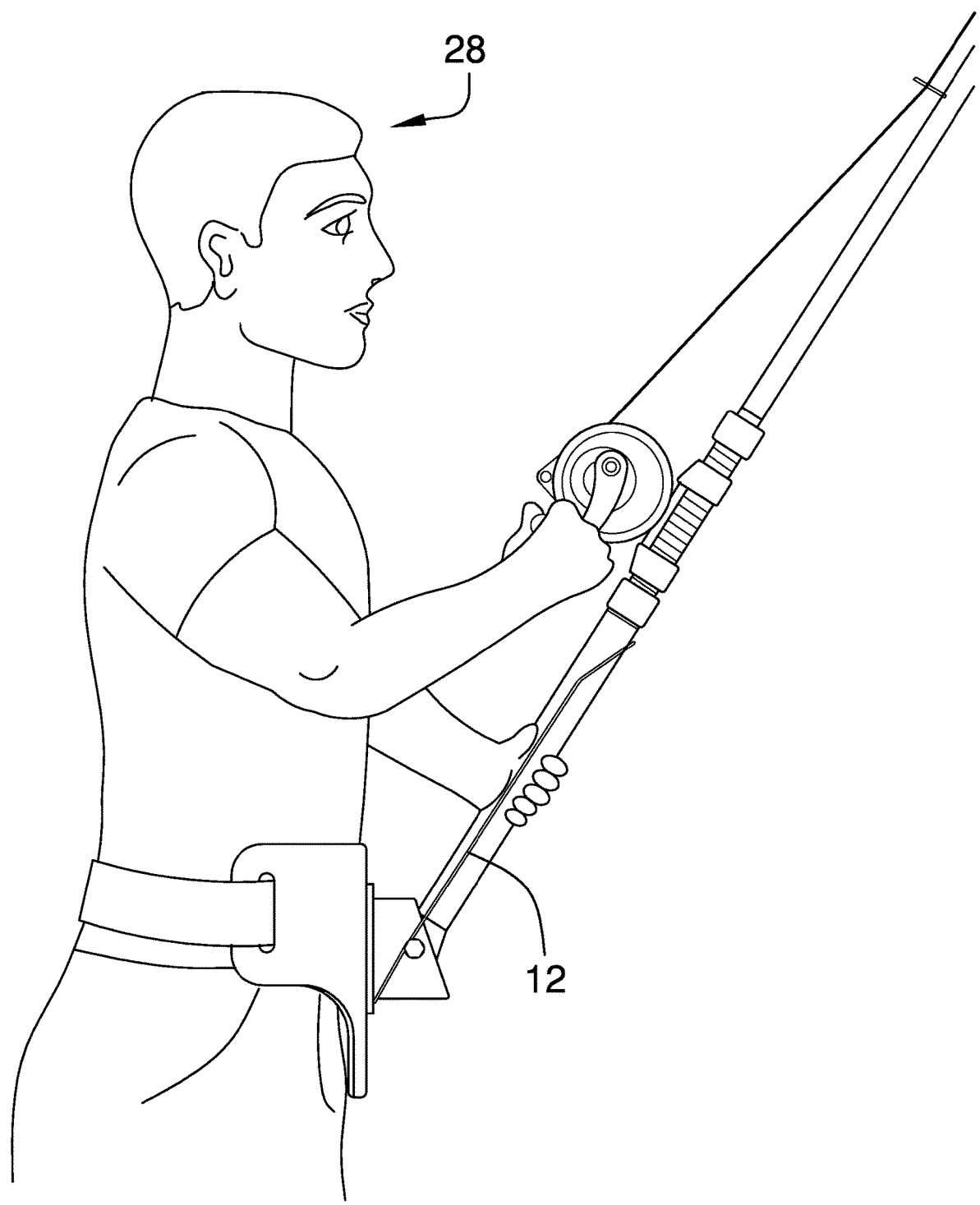
FIG. 7 is a perspective in-use view of an embodiment of the disclosure.
Figure 8:
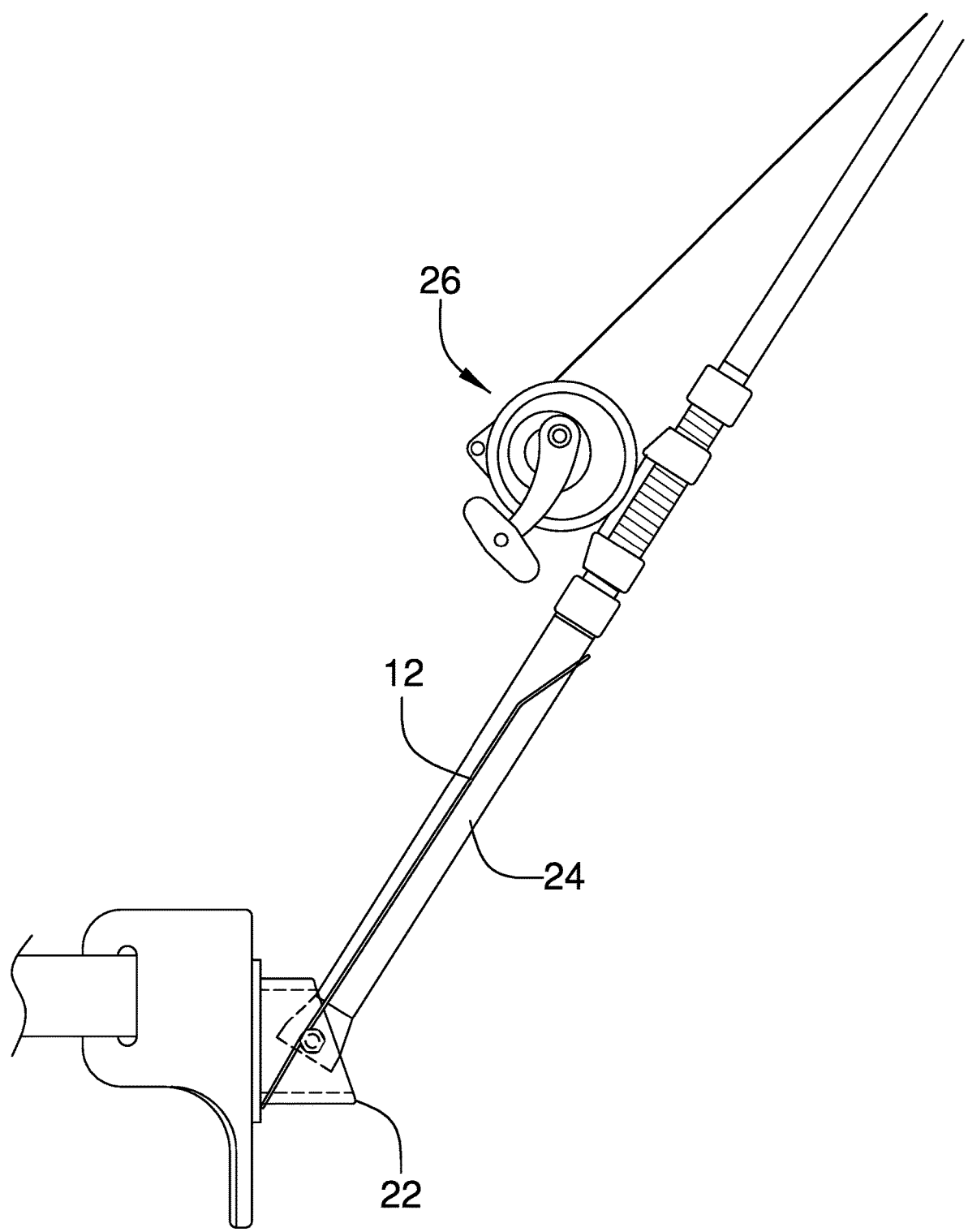
FIG. 8 is a right side phantom view of an embodiment of the disclosure showing a fishing pole being biased upwardly on a fishing belt.
Figure 9:
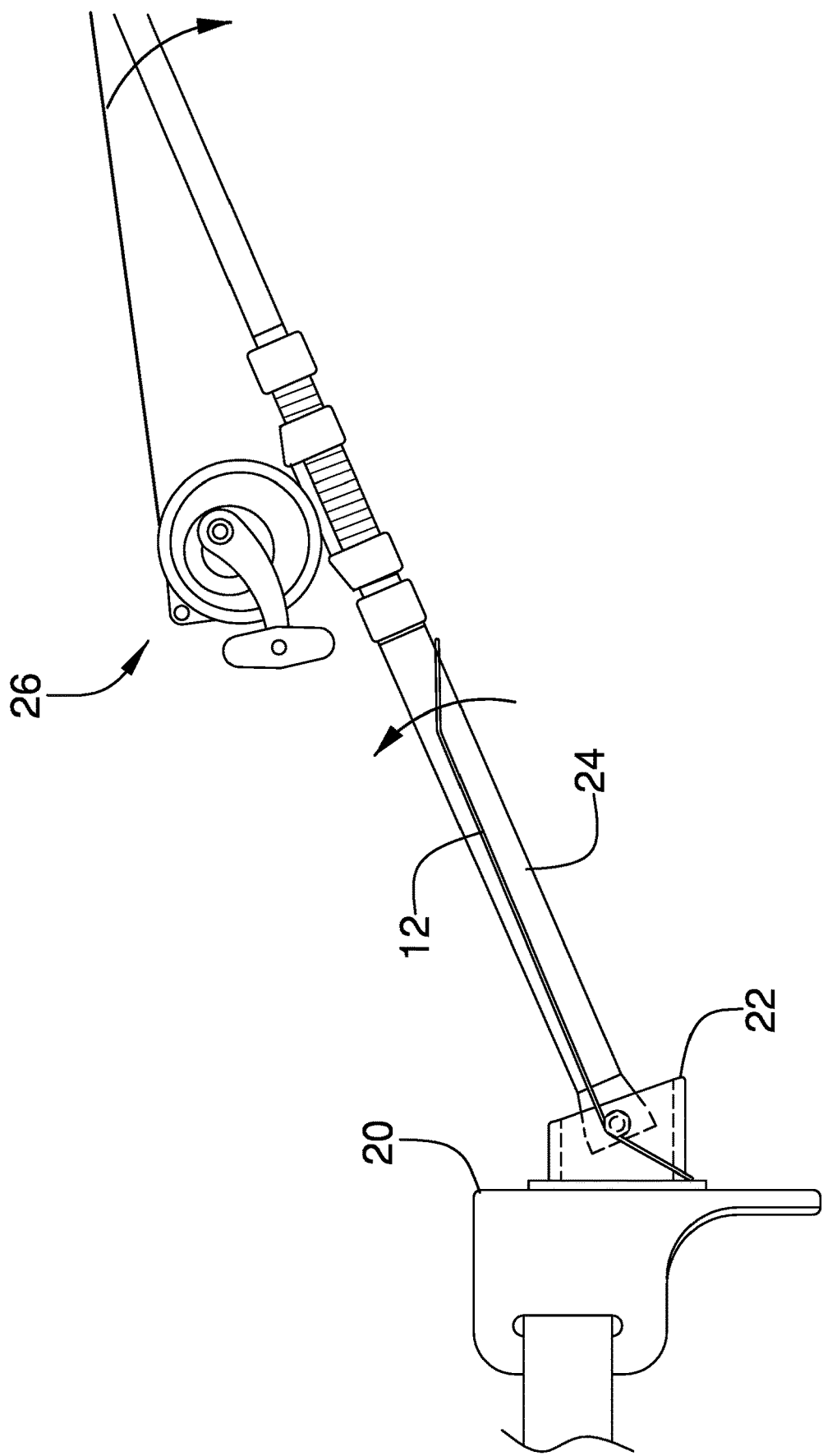
FIG. 9 is a right side phantom view of an embodiment of the disclosure showing a fishing pole being urged downwardly on a fishing belt.
Figure 10:
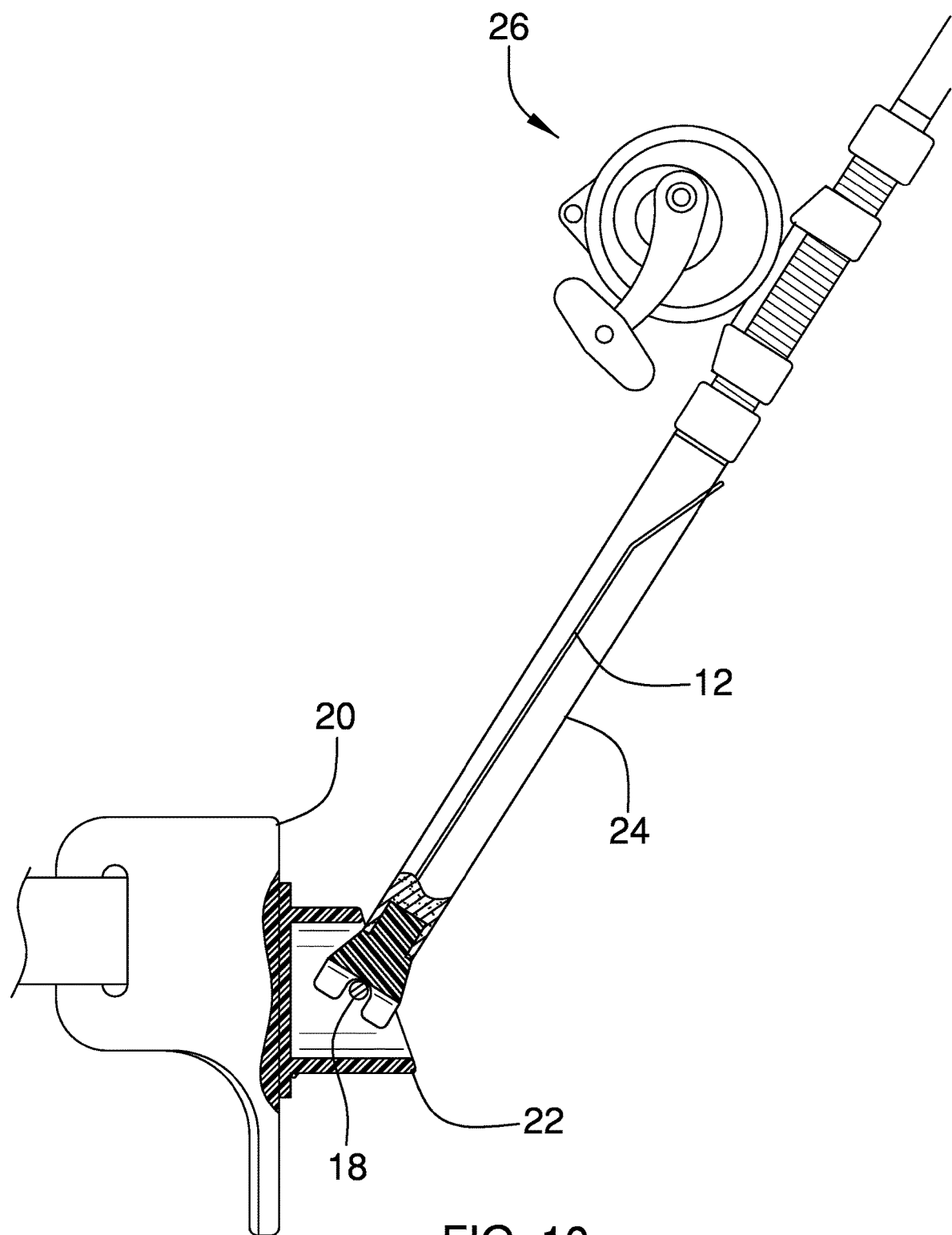
FIG. 10 is a right side cut-away view of an embodiment of the disclosure.

With reference now to the drawings, and in particular to FIGS. 1 through 10 thereof, a new fishing pole device embodying the principles and concepts of an embodiment of the disclosure and generally designated by the reference numeral 10 will be described.

As best illustrated in FIGS. 1 through 10, the fishing pole support assembly 10 generally comprises a member 12 that is formed into an ovoid shape having each of a pair of ends 14 of the member 12 being spaced apart from each other. The member 12 has a pair of coils 16 each formed into the member 12 and the pair of coils 16 is positioned on opposing sides of the ovoid shape defined by the member 12. In this way a cup pin 18 of a fishing belt 20 can be extended through each of the pair of coils 16 for attaching the member 12 to a cup 22 of the fishing belt 20. The member 12 extends 14 beneath a handle 24 of a fishing rod 26 when the handle 24 of the fishing rod 26 is inserted into the cup 22 of the fishing belt 20 thereby facilitating the member 12 to bias the fishing rod 26 to angle upwardly with respect to the cup 22. In this way the member 12 can assist a fisherman 28 with landing a pelagic fish with the fishing rod 26.

The member 12 has a pair of first curves 30 each extending between a respective one of the coils 16 and a respective one of the pair of ends 14 of the member 12 such that the pair of first curves 30 defines a first end 32 of the ovoid shape defined by the member 12. The pair of ends 14 of the member 12 is urgeable away from each other thereby facilitating the pair of first curves 30 to accommodate various sizes of cups of fishing belts. The member 12 has a pair of sidelong portions 34 each extending away from a respective one of the coils 16. Each of the sidelong portions 34 is oriented parallel with each other such that each of the sidelong portions 34 defines a respective one of a pair of sides of the ovoid shape defined by the member 12. In this way each of the sidelong portions 34 extends alongside the handle 24 of the fishing rod 26 when the handle 24 is inserted into the cup 22 of the fishing belt 20.

The member 12 has a second curve 36 extending between the pair of sidelong portions 34 such that the second curve 36 defines a second end 38 of the ovoid shape defined by the member 12. The second curve 36 curves in an opposite direction with respect to the pair of first curves 30 and each of the sidelong portions 34 has a bend 40 that is located at an intersection between the second curve 36 and the pair of sidelong portions 34. In this way the second curve 36 lies on a plane that is oriented at an angle 42 with the pair of sidelong portions 34 thereby facilitating the second curve 36 to extend beneath the handle 24 of the fishing rod 26 when the handle 24 is inserted into the cup 22 of the fishing belt 20.

As is most clearly shown in FIG. 2, the angle 42 defined between the second curve 36 and the pair of sidelong portions 34 may be approximately 25.0 degrees. Each of the coils 16 biases the pair of sidelong portions 34 to lie on a plane that is oriented coplanar with a respective one of the first curves 30. Conversely, each of the sidelong portions 34 is urgeable to lie on a plane that is oriented at an angle with the pair of first curves 30.

In use, member 12 is positioned on the cup 22 of the fishing belt 20 such that each of the coils 16 is aligned with a respective one of a pair of holes 44 in the cup 22 of the fishing belt 20 having each of the first curves 30 extending 14 beneath the cup 22. The cup pin 18 is extended through each of the coils 16 and the pair of holes 44 to attach the member 12 to the cup 22. In this way the pair of sidelong portions 34 angles upwardly from the cup 22. The handle 24 of the fishing rod 26 is inserted into the cup 22 such that the handle 24 of the fishing rod 26 rests on the second curve 36 of the member 12. In this way the fishing rod 26 is biased toward the fisherman 28 while the fisherman 28 is attempting to land a pelagic fish. Thus, the member 12 assists the fisherman 28 with raising the fishing rod 26 during the process of repeatedly winding fishing line in to the fishing rod 26 and subsequently raising the fishing rod 26 while landing the pelagic fish. In this way a physically limited fisherman, such as an elderly person or a person with a shoulder injury for example, is assisted with landing the pelagic fish.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing pole support system for assisting a fisherman with landing a pelagic fish, said assembly comprising:
   a fishing belt being configured to be worn around the waist of the fisherman, said fishing belt having a cup for insertably receiving a handle of a fishing rod wherein said cup is configured to support the fishing rod for the fisherman while the fisherman is landing the pelagic fish, said cup having an outer wall, said cup having a pair of holes extending through said outer wall, said pair of holes being positioned on opposite sides of said outer wall with respect to each other;
   a cup pin extending through each of said holes in said outer wall of said cup thereby facilitating said cup pin to engage a gimbal on the handle of the fishing rod;
   a member being formed into a bent oval shape having each of a pair of ends of said member being spaced apart from each other, said member having a pair of coils each being formed into said member, said pair of coils being positioned on opposing sides of said bent oval shape defined by said member thereby facilitating a cup pin of a fishing belt to be positioned extending through each of said pair of coils for attaching said member to a cup of the fishing belt, said member extending beneath the handle of the fishing rod when the handle of the fishing rod is inserted into the cup of the fishing belt thereby facilitating said member to bias the fishing rod to angle upwardly with respect to the cup wherein said member is configured to assist a fisherman with landing the pelagic fish with the fishing rod.

2. The system according to claim 1, wherein said member has a pair of first curves each extending between a respective one of said coils and a respective one of said pair of ends of said member such that said pair of first curves defines a first end of said bent oval shape defined by said member, said pair of ends of said member being urgeable away from each other thereby facilitating said pair of first curves to accommodate various sizes of cups of fishing belts.

3. The system according to claim 2, wherein said member has a pair of sidelong portions each extending away from a respective one of said coils, each of said sidelong portions being oriented parallel with each other such that each of said sidelong portions defines a respective one of a pair of sides of said bent oval shape defined by said member thereby facilitating each of said sidelong portions to extend alongside the handle of the fishing rod when the handle is inserted into the cup of the fishing belt.

4. The system according to claim 3, wherein said member has a second curve extending between said pair of sidelong portions such that said second curve defines a second end of said bent oval shape defined by said member, said second curve curving in an opposite direction with respect to said pair of first curves.

5. The system according to claim 4, wherein each of said sidelong portions has a bend being located at an intersection between said second curve and said pair of sidelong portions such that said second curve lies on a plane being oriented at an angle relative to said pair of sidelong portions thereby facilitating said second curve to extend beneath the handle of the fishing rod when the handle is inserted into the cup of the fishing belt.

6. The system according to claim 3, wherein each of said coils biases said pair of sidelong portions to lie on a plane being oriented coplanar with a respective one of said first curves.

7. The system according to claim 3, wherein each of said sidelong portions is urgeable to lay on a plane being oriented at an angle with said pair of first curves.

8. A fishing pole support system for assisting a fisherman with landing a pelagic fish, said system comprising:
- a fishing belt being configured to be worn around the waist of a fisherman, said fishing belt having a cup for insertably receiving a handle of a fishing rod wherein said cup is configured to support the fishing rod for the fisherman while the fisherman is landing a pelagic fish, said cup having an outer wall, said cup having a pair of holes extending through said outer wall, said pair of holes being positioned on opposite sides of said outer wall with respect to each other;
- a cup pin extending through each of said holes in said outer wall of said cup thereby facilitating said cup pin to engage a gimbal on the handle of the fishing rod; and
- a member being formed into a bent oval shape having each of a pair of ends of said member being spaced apart from each other, said member having a pair of coils each being formed into said member, said pair of coils being positioned on opposing sides of said bent oval shape defined by said member thereby facilitating said cup pin to be positioned extending through each of said pair of coils for attaching said member to said cup of said fishing belt, said member extending beneath a handle of a fishing rod when the handle of the fishing rod is inserted into said cup of said fishing belt thereby facilitating said member to bias the fishing rod to angle upwardly with respect to said cup wherein said member is configured to assist a fisherman with landing a pelagic fish with the fishing rod, said member having a pair of first curves each extending between a respective one of said coils and a respective one of said pair of ends of said member such that said pair of first curves defines a first end of said bent oval shape defined by said member, said pair of ends of said member being urgeable away from each other thereby facilitating said pair of first curves to accommodate various sizes of cups of fishing belts, said member having a pair of sidelong portions each extending away from a respective one of said coils, each of said sidelong portions being oriented parallel with each other such that each of said sidelong portions defines a respective one of a pair of sides of said bent oval shape defined by said member thereby facilitating each of said sidelong portions to extend alongside the handle of the fishing rod when the handle is inserted into said cup of said fishing belt, said member having a second curve extending between said pair of sidelong portions such that said second curve defines a second end of said bent oval shape defined by said member, said second curve curving in an opposite direction with respect to said pair of first curves, each of said sidelong portions having a bend being located at an intersection between said second curve and said pair of sidelong portions such that said second curve lies on a plane being oriented at an angle relative to said pair of sidelong portions thereby facilitating said second curve to extend beneath the handle of the fishing rod when the handle is inserted into said cup of said fishing belt, each of said coils biasing said pair of sidelong portions to lie on a plane being oriented coplanar with a respective one of said first curves, each of said sidelong portions being urgeable to lie on a plane being oriented at an angle with said pair of first curves.

\* \* \* \* \*